(12) United States Patent
Snyder

(10) Patent No.: US 10,049,165 B1
(45) Date of Patent: Aug. 14, 2018

(54) SYSTEM AND METHOD FOR SOCIAL PLAY

(71) Applicant: Kavita Ramchandani Snyder, Saratoga, CA (US)

(72) Inventor: Kavita Ramchandani Snyder, Saratoga, CA (US)

( * ) Notice: Subject to any disclaimer, the term of this patent is extended or adjusted under 35 U.S.C. 154(b) by 0 days.

(21) Appl. No.: 15/706,522

(22) Filed: Sep. 15, 2017

(51) Int. Cl.
*G07F 17/32* (2006.01)
*G06F 17/30* (2006.01)
*G06Q 10/02* (2012.01)

(52) U.S. Cl.
CPC ....... *G06F 17/30867* (2013.01); *G06Q 10/02* (2013.01)

(58) Field of Classification Search
USPC .......................................................... 700/91
See application file for complete search history.

(56) References Cited

U.S. PATENT DOCUMENTS

| | | | |
|---|---|---|---|
| 2008/0281710 A1* | 11/2008 | Hoal | G06Q 30/02 705/14.39 |
| 2008/0282324 A1* | 11/2008 | Hoal | G06Q 30/02 726/3 |
| 2012/0190386 A1* | 7/2012 | Anderson | G01C 15/04 455/456.3 |
| 2013/0290202 A1* | 10/2013 | Nunnery | G06Q 50/01 705/319 |
| 2015/0127737 A1* | 5/2015 | Thompson | G06F 19/3418 709/204 |
| 2016/0171453 A1* | 6/2016 | Zorfas | G06Q 10/1095 705/7.19 |

* cited by examiner

*Primary Examiner* — Pierre E Elisca
(74) *Attorney, Agent, or Firm* — Herbert T. Patty, Esq.

(57) ABSTRACT

The present invention relates to a novel system and method for social play. The novel system and method includes a non-transitory machine readable storage medium containing instructions to cause a machine to send a request to a plurality of subscribers who fit a first profile to play a physical sport at a first venue and during a first time period. The first profile comprises at least one criteria and is partially set by a sender of the request and in part configured by default settings.

22 Claims, 9 Drawing Sheets

FIGURE 1

▼ New Practice

Your Team *

[ - Select - ◊ ]  ← 101

Choose your team to assign this practice to.

Practice Description and Notes

[                    102                    ]

Enter details about the practice (Description, notes, etc.)

Practice Start Date *

Date                    Time

[    103    ]          [    104    ]

E.g., 03/20/2016       E.g., 10:12 am

Repeat Count

[ 1 ]  ← 105

Enter the number of weeks for this practice to repeat. (Automatically creates that many practices)

( Add practice )

Singles Selection (select 2)

| Name | Lineup |
|---|---|
| ☐ Player1_1 Smith | |
| ☐ player1_2@tennisfolder.com | |
| ☐ player1_5@tennisfolder.com | |
| ☐ player1_11@tennisfolder.com | |

Doubles Selection (select 3)

| Name | Partner2 | Lineup |
|---|---|---|
| ☐ Player1_1 Smith | player1_7@tennisfolder.com | |
| ☐ Player1_1 Smith | player1_9@tennisfolder.com | |
| ☐ Player1_1 Smith | player1_5@tennisfolder.com | |
| ☐ Player1_1 Smith | player1_6@tennisfolder.com | |
| ☐ Player1_1 Smith | player1_10@tennisfolder.com | |
| ☐ Player1_1 Smith | player1_11@tennisfolder.com | |
| ☐ player1_7@tennisfolder.com | player1_9@tennisfolder.com | |
| ☐ player1_5@tennisfolder.com | player1_7@tennisfolder.com | |
| ☐ player1_6@tennisfolder.com | player1_9@tennisfolder.com | |
| ☐ player1_6@tennisfolder.com | player1_10@tennisfolder.com | |
| ☐ player1_7@tennisfolder.com | player1_11@tennisfolder.com | |
| ☐ player1_9@tennisfolder.com | player1_10@tennisfolder.com | |
| ☐ player1_9@tennisfolder.com | player1_11@tennisfolder.com | |
| ☐ player1_5@tennisfolder.com | player1_11@tennisfolder.com | |
| ☐ player1_6@tennisfolder.com | player1_10@tennisfolder.com | |
| ☐ player1_6@tennisfolder.com | player1_11@tennisfolder.com | |
| ☐ player1_10@tennisfolder.com | player1_11@tennisfolder.com | |

[Submit Lineup]

| Name | 401 | Lineup 402 | Score 403 | Win 404 | Loss 405 | Draw 406 |
|---|---|---|---|---|---|---|
| Player1_1 Smith ☒ ☎ 408-667-0600 | | S1 | 6-1 6-2 | 1 | | |
| Player1_2 Smith ☒ ☎ --- | | S2 | 7-6 5-7 1-0 | | 1 | |
| player1_3@tennisfolder.com ☒ ☎ --- | | D2 | 6-3 6-3 | 1 | | |
| player1_4@tennisfolder.com ☒ ☎ --- | | D3 | 6-4 6-2 | 1 | | |
| player1_5@tennisfolder.com ☒ ☎ --- | | D1 | 6-2 5-7 1-0 | 1 | | |
| player1_6@tennisfolder.com ☒ ☎ --- | | D2 | 6-3 6-3 | 1 | | |
| player1_7@tennisfolder.com ☒ ☎ --- | | D1 | 6-2 5-7 1-0 | | 1 | |
| player1_8@tennisfolder.com ☒ ☎ --- | | D3 | 6-4 6-1 | | | |

Matches

| Match | Win | Loss | Draw |
|---|---|---|---|
| 02/27/16 10:00 AM: (home) BROOKESIDE 40AW3 | 3 | 2 | 0 |
| 03/05/16 3:00 PM: (away) BROOKESIDE 40AW3 | 3 | 2 | 0 |
| 03/12/16 3:30 PM: (away) LOS GATOS 5R 40AW3 | 0 | 0 | 0 |
| 02-29 5:00: (home) Brookside Bears | 3 | 0 | 0 |
| 03-08 16:00: (away) Hollister House | 0 | 0 | 0 |
| 03-10 13:00: (home) Union City Winners | 0 | 0 | 0 |
| 03-12 16:00: (home) Millbrae Mighty | 0 | 0 | 0 |
| 03-17 19:00: (away) Oakland Otters | 0 | 0 | 0 |
| 03-18 14:00: (home) Pittsburg Pirates | 0 | 0 | 0 |

Use the first column to indicate your availability for the match. Click on the title of the match to see details for that particular match.

| Avail? | Match | Avail | Conf |
|---|---|---|---|
| ▓ | 03-22 18:00: (away) Yuba City Yonkers | 8 | 0 |
| ◯ | 03-24 16:00: (home) London Losers | 0 | 0 |

USTA Rating:
3.5

Gender:
Female

▼ *Food List*

The items listed are defaults. You can modify them as you wish, using very short descriptions. They are used in Match food assignments

| Beer | Eggs ⟵ 601 |
| Main dish | Dessert |
| Water/sodas | Appetizer |
| Red wine | White wine |

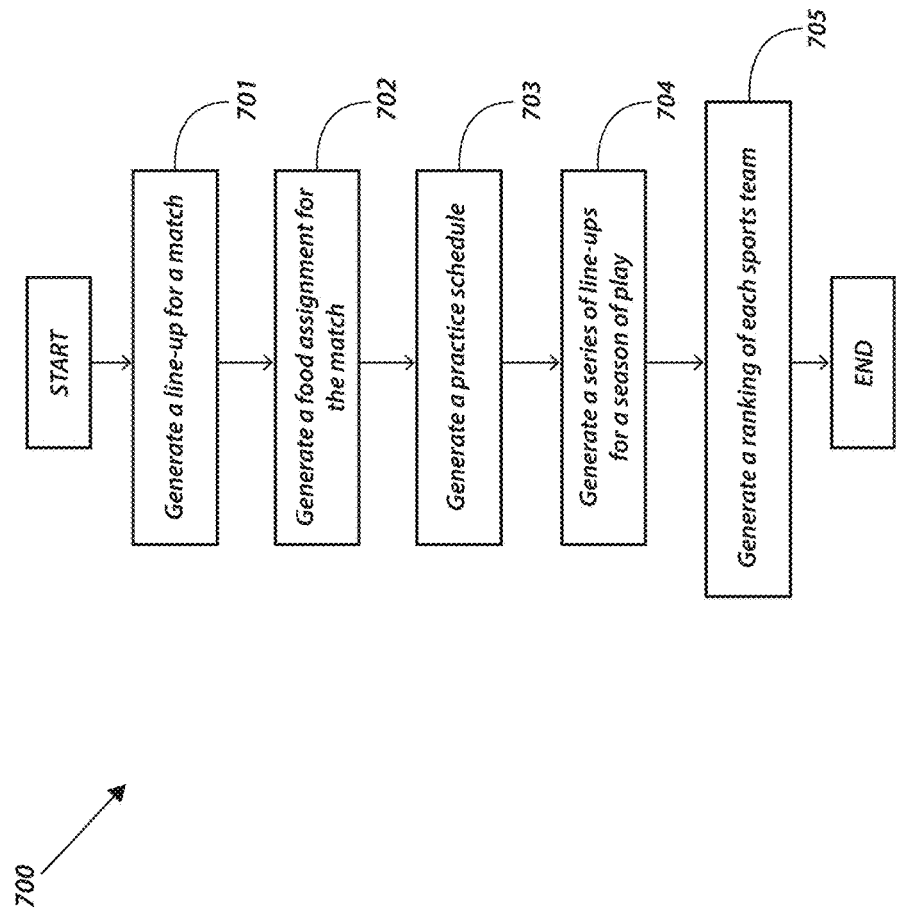

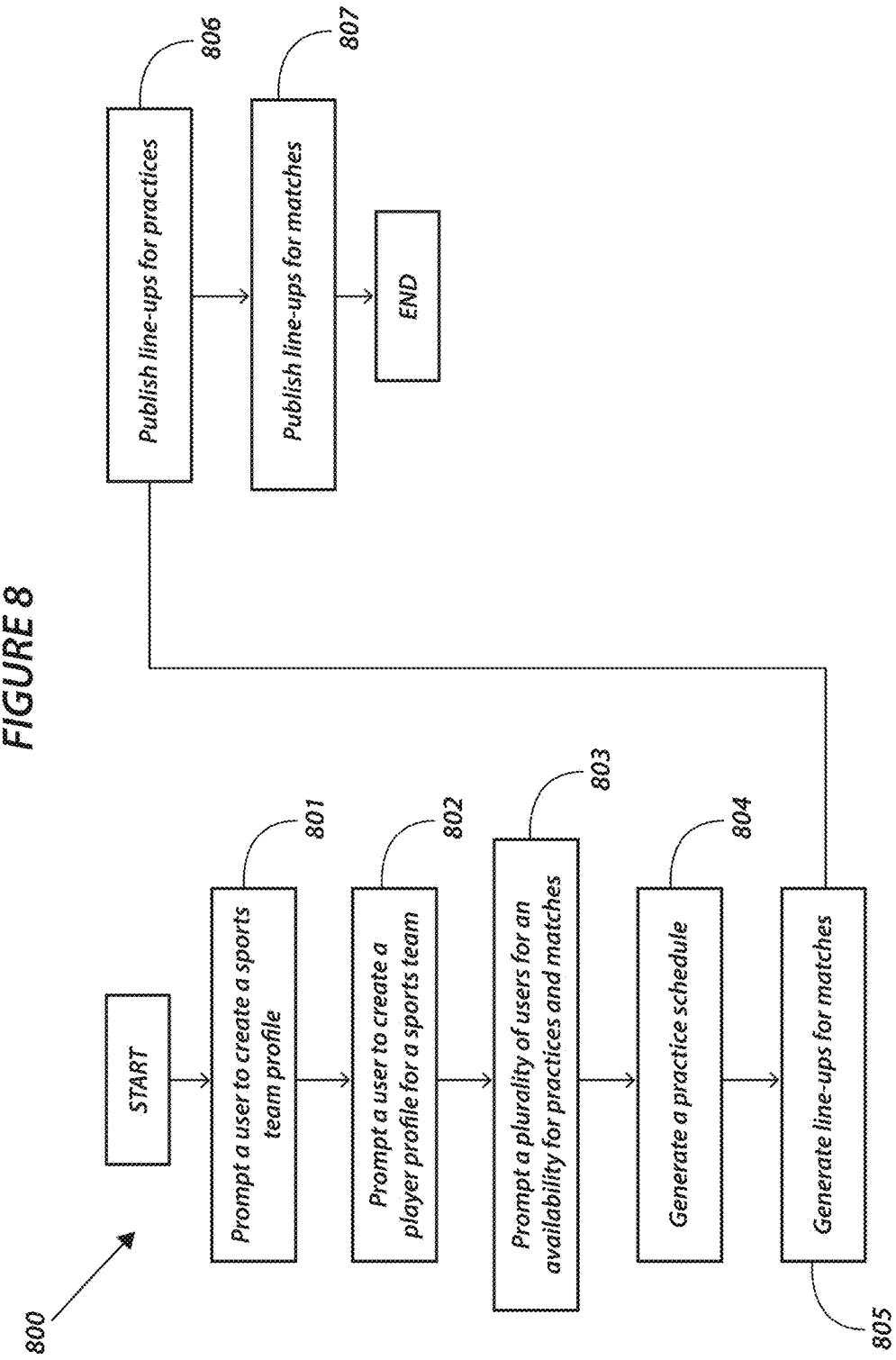

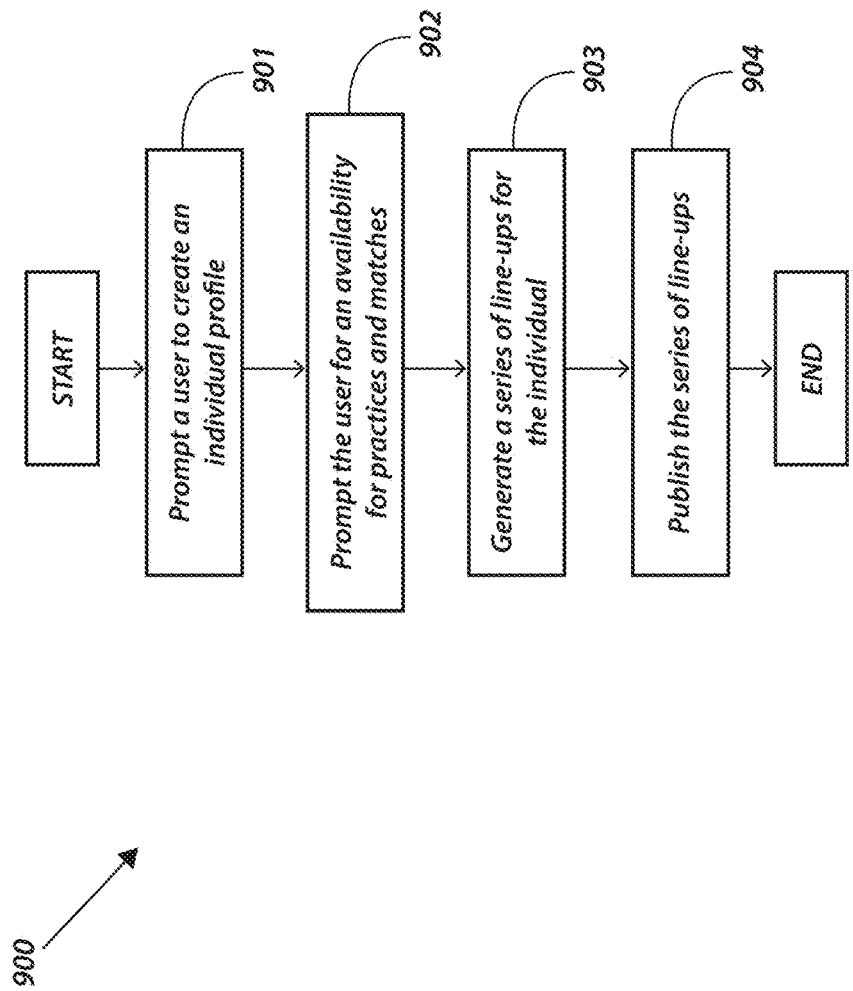

SYSTEM AND METHOD FOR SOCIAL PLAY

FIELD OF THE DISCLOSURE

The present invention relates to a novel system and method to employ social play.

BRIEF DESCRIPTION OF THE DRAWINGS

To facilitate understanding, identical reference numerals have been used, wherever possible, to designate identical elements that are common to the figures. The drawings are not to scale and the relative dimensions of various elements in the drawings are depicted schematically and not necessarily to scale. The techniques of the present invention may readily be understood by considering the following detailed description in conjunction with the accompanying drawings, in which:

FIG. 1 is a screenshot of a window within a software application for users to schedule practices.

FIG. 2 is a screenshot of a window within the software application for users to schedule line-ups for matches.

FIG. 4 is a screenshot of a window within the software application for users to view their wins and losses record during a season of play.

FIG. 5 is a screenshot of a window within a software application for users to view scheduled matches along with a record of wins and losses for a season.

FIG. 6 is a screenshot of a window within the software application for users to select food options for food assignments.

FIG. 7 is a flowchart of a method of scheduling matches consistent with the present invention.

FIG. 8 is another flowchart of a method of scheduling matches consistent with the present invention.

FIG. 9 is yet another flowchart of a method of scheduling matches consistent with the present invention.

DETAILED DESCRIPTION

Figure 3:
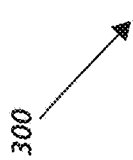
FIG. 3 is a screenshot of a window within the software application for users to schedule their availability for types of matches.

Before the present invention is described in detail, it is to be understood that, unless otherwise indicated, this disclosure is not limited to specific procedures or articles, whether described or not.

It is further to be understood that the terminology used herein is for the purpose of describing particular embodiments only and is not intended to limit the scope of the present invention.

It must be noted that as used herein and in the claims, the singular forms "a," and "the" include plural referents unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure. The term "about" generally refers to ±10% of a stated value.

The present invention relates to a novel system and method for social play. The novel system and method includes a non-transitory machine readable storage medium containing instructions to cause a machine to send a request to a plurality of subscribers who fit a first profile to play a physical sport at a first venue and during a first time period. The first profile comprises at least one criteria and is partially set by a sender of the request and in part configured by default settings.

It should be understood that although some embodiments described herein are related to tennis matches, the present invention is not limited thereto. As such, the present invention may be amenable to any sports or non-sports competition. For example, the present invention may be adapted to any team sport such as, but not limited to, football, baseball, basketball, lacrosse, volleyball, water polo, etc. Likewise, the present invention may be further adapted to any non-sport such as chess, debate, etc.

Moreover, the present invention provides a manner for individuals, such as owners, team captains, etc., to set up team profiles such that matches, practices, and event assignments can be scheduled electronically. Leagues can therefore be created such that teams and players can schedule matches as well as update and view their records for any given season. In some implementations, the system may be fed data from other third-party sources such as international league organizations.

A team captain can register a team. For example, a team captain can register a team within a tennis league. Advantageously, once a team is registered, a software application consistent with the present invention (as described herein) can be used to organize practices, matches, and to communicate with teammates or players on other teams registered within the league.

Upon registering, the software application may request any of a plurality of information. For example, the team captain may be requested to select or submit a team name, choose a league, indicate the gender of team members, select a rating, select a format, and enter the team roster.

Moreover, a team captain may select a team co-captain. In one or more embodiments of the present invention, the team co-captain may have the same access of that of the team captain. However, the team captain may have special administrative privileges to restrict the permission settings of the team co-captain.

For some sporting events, it is customary for teams to be responsible for ancillary activities. For instance, in tennis, it is often customary in non-professional leagues for the home team to provide refreshments for the visiting team. As such, the software application described herein may be adaptable to allow users (e.g., team captains) the ability to setup food assignments.

In addition, the software application can be used to invite team members to join and set up profiles. Furthermore, the team members may be asked to select or solicit ideas for the team name, preferred practice times, preferred match times, and preferred food, etc.

Upon signing up, team members can create a profile that includes their personal information along with other pertinent information that may be needed by the team captain to schedule matches, etc. A user's profile may include the user's full name, email address, contact phone number, gender, rating, notification preferences, availability, and records.

FIG. 1 is a screenshot of a window 100 within an application for users to schedule practices. As shown, window 100 allows a team captain (e.g., or co-captain) to select a team (e.g., using scroll bar 101). However, it should be understood by one having ordinary skill in the art that the present invention is not limited to this implementation. In some embodiments, a team captain can enter the team name in a designated field.

Window 100 also includes a field 102 for the team captain to enter a practice description or other notes which are distributed to team members. Most importantly, the window 100 includes fields 103, 104 for entering practice dates and times. An indication for the frequency of practices is also configurable as shown by field 105.

Accordingly, the software application provided by the present invention gives the user (e.g., captain) the ability to schedule and disseminate notices of practices to team members and other team personnel in an efficient manner. The software application may have the capability to make a schedule based upon the priorities of each team. For example, the software application receives the priorities of each team (e.g., Week 1—priority 1: Monday; priority 2: Thursday; priority 3: Saturday) for each week of play within a tournament or season. Notably, the software applications can propose several schedules which balance the priorities of each team.

FIG. 2 is a screenshot 200 of a window within an application for users to schedule line-ups for matches. As shown in the figure, a user can select the names of players for each match type. For example, the team captain can select two players by their identifier (e.g., name and/or email address) for a singles tennis match. Alternatively, the team captain can select players for a doubles tennis match.

FIG. 3 is a screenshot 300 of a window within an application for users to schedule their availability for types of matches. Advantageously, a user administrator can access the availability for matches (by match type) for each player on the team. For instance, Player1_1 Smith is shown to be available for singles and doubles tennis matches.

In one or more embodiments, each entry of the team members listed may include a hyperlink to access the team member's contact information (e.g., phone number, email address, physical address, social media profile, etc.). When not enough players are available for a future match, an error or warning message may be automatically generated.

FIG. 4 is a screenshot 400 of a window within an application for users to view their record during a season of play. The screenshot 400 lists players of a tennis team along with the line-ups and record. For example, screenshot 400 shows line-ups for two singles matches (i.e., S1 and S2), and three doubles matches (i.e., D1, D2, and D3). For instance, for the first doubles match (i.e., D1), both player1_5@tennisfolder.com and player1_7@tennisfolder.com have a "1" in the wins column for match scores of 6-2, 5-7, and 1-0. Contrariwise, for the third doubles match (i.e., D3), both player1_4@tennisfolder.com and player1_8@tennisfolder.com have a "1" in the loss column for match scores of 6-4 and 6-2.

FIG. 5 is a screenshot 500 of a window within an application for users to view scheduled matches along with a record of wins and losses for a season. In particular, a user can view a list of scheduled tennis matches along with a team's wins and loss record. Additionally, screenshot 500 shows team members to indicate their availability for a match. For example, the matches scheduled on Mar. 22, 2016 at 18:00, eight team members are available for an away game against the Yuba City Yonkers. Alternatively, no team member has indicated their availability for a home game against the London Losers.

FIG. 6 is a screenshot 600 of a window within an application for users to select food options for food assignments. Food assignment duties may be assigned in a round-robin fashion or may be assigned to one team member. Screenshot 600 indicates a team rating (e.g. USTA rating of 3.5). In one or more implementations, a team rating may be imported from a third-party software application. In yet other implementations, a team captain or other authorized team member can import the team's rating into the system. In addition, the gender of the team or team member may be imported.

Most notably, a user may select any of available food options. In particular, screenshot 600 displays default food options 601 which may be modified if desired. For example, the available food options are beer, eggs, dessert, appetizer(s), white wine, any of various main dishes, water/soda, or red wine. In some implementations, a team can view or may receive a message of the food that will be brought to a match.

FIG. 7 is a flowchart 700 of a method of scheduling matches consistent with the present invention. In some implementations, the method described herein may be directed towards league play. It should be understood by those having ordinary skill in the art that the actions described in flowchart 700 may not be executed in any particular order.

Flowchart 700 begins with block 701—generate a line-up for a match. It should be understood that the method disclosed herein is not limited to tennis matches but may be applicable for any competition, particularly sports contests.

Block 702—generate a food assignment for the match. As described with regards to FIG. 6, a user (e.g., any team members) may choose from any available food option. Advantageously, the system described herein provides an efficient manner to handle logistics associated with the match.

Flowchart 700 proceeds to block 703—generate a practice schedule for each sports team. A team captain, co-captain, or other authorized personnel may generate a practice schedule based on team member's availability. Once a practice schedule is created (e.g., for the next week or entire season), the schedule may be published to all that are affiliated with the team (e.g., team members).

In some embodiments, when not enough players have indicated there availability for a practice, the system may send a request (e.g., via a social play option) for a tennis player in the area near the practice facility (e.g., configurable) to fill in to avoid cancelling the practice session. As such, the system may allow users to be contacted to fill in for practices if they have indicated such interest in their profile. Moreover, a team captain may indicate whether to allow tennis players from the public to join their team for practices.

In one or more embodiments, the method may also include assigning a venue (e.g., tennis court) for the scheduled practice (or match). Options for the venue may be automatically generated or may be selected manually. In some embodiments, the system may allow system administrators and/or select subscribers to upload new venue profiles such that the system has the ability to expand in utility.

Next, according to some implementations, flowchart 700 proceeds to generate a series of line-ups for a season of play (block 704). The series of line-ups may be generated by receiving the match availability from the team members.

Once the series of line-ups are generated, the line-ups may be published to all that are affiliated with the team.

Lastly, according to block 705, generate a ranking of each sports team. In some embodiments, the ranking of each sports team is generated based on a record of wins and losses for each sports team. As described above, a team's ranking may be imported from a third-party source or by manual intervention.

FIG. 8 is another flowchart 800 of a method of scheduling matches consistent with the present invention. In some implementations, the method described herein may be directed towards league play. It should be understood by those having ordinary skill in the art that the actions described in flowchart 800 may not be executed in any particular order.

Flowchart 800 begins with block 801—prompt a user to create a sports team profile. The team profile may include team information such as, but not limited to, a team's name, logo, record of wins and losses, roster, etc. Advantageously, each team within a league may create a team profile such that each team within the league may be available. A league, or club, may direct team captains to create a sports team profile such that each league has an efficient manner for team supervision and management.

Next, prompt a user to create a player profile for a sports team (block 802). In some implementations, a personal identifier is assigned to each player profile. Accordingly, each player can create a profile such that each team has a player profile for each team member. In some embodiments, any person associated with the team can create a profile to receive updates regarding practices, matches, etc.

Next, prompt a plurality of users for an availability for practices and matches (block 803). Advantageously, once the availability for practices and matches are received from a critical mass of team members, the team captain, co-captain, or other authorized personnel may generate practice schedules and matches.

Next, generate a practice schedule according to block 804. As described above, the practice schedule may be based on player availability.

Block 805—generate line-ups for matches. The strengths of each team member may be displayed on each team's profile may be used as a basis for generating line-ups. For instance, if there are players on the team which have good chemistry, a team captain may factor this in when creating line-ups.

Next, publish line-ups for practices (806) and matches (807). Publishing may be accomplished via email, text message, in-app messaging, or any other suitable means known in the art.

In addition, a court may be assigned for each scheduled match according to some embodiments. The assigned courts may be published according to a pre-determined frequency.

FIG. 9 is yet another flowchart 900 of a method of scheduling matches consistent with the present invention. In some implementations, the method described herein may be directed towards social play. Flowchart 900 begins with block 901—prompt an application user to create an individual profile. The individual profile may include the user's name, player preferences, gender, age, and resident location. For example, the individual profile may include the user's records of wins and losses.

Block 902—prompt the user for an availability of practices and matches. Once the user sets their availability, the system may automatically generate a series of line-ups for the user or provide options for a user to select line-ups for practices and matches. As such, an individual can set up practices and matches with other individuals according to gender, resident location, rating, ranking, etc. Therefore, application users without associates or friends that share the same interest can find other available individuals for sports play. Most importantly, application users can choose to play with individuals of a particular gender, rating, ranking, etc.

Block 903—generate a series of line-ups for the application user. In some embodiments, the series of line-ups (block 904) are published via email, text, in-app messaging, etc.

In some implementations, application users involved in league play may select an option to engage in social play as well. For example, line-ups may be generated based on an application user's gender, resident location, rating, ranking, etc. which may be based in part on the application user's record of wins and losses. Therefore, after a season of play, individual application users have the capability to effectively find other individuals to practice with or compete against in an efficient manner.

For instance, if an application user is planning to vacation out-of-state, the application user can use the system to set up practice sessions or recreational matches with other individuals at or near the vacation area. In addition, the application users can set up practices and matches during league play.

A court may be assigned for each scheduled match. The assigned courts may be published according to a pre-determined frequency.

Figure 10:
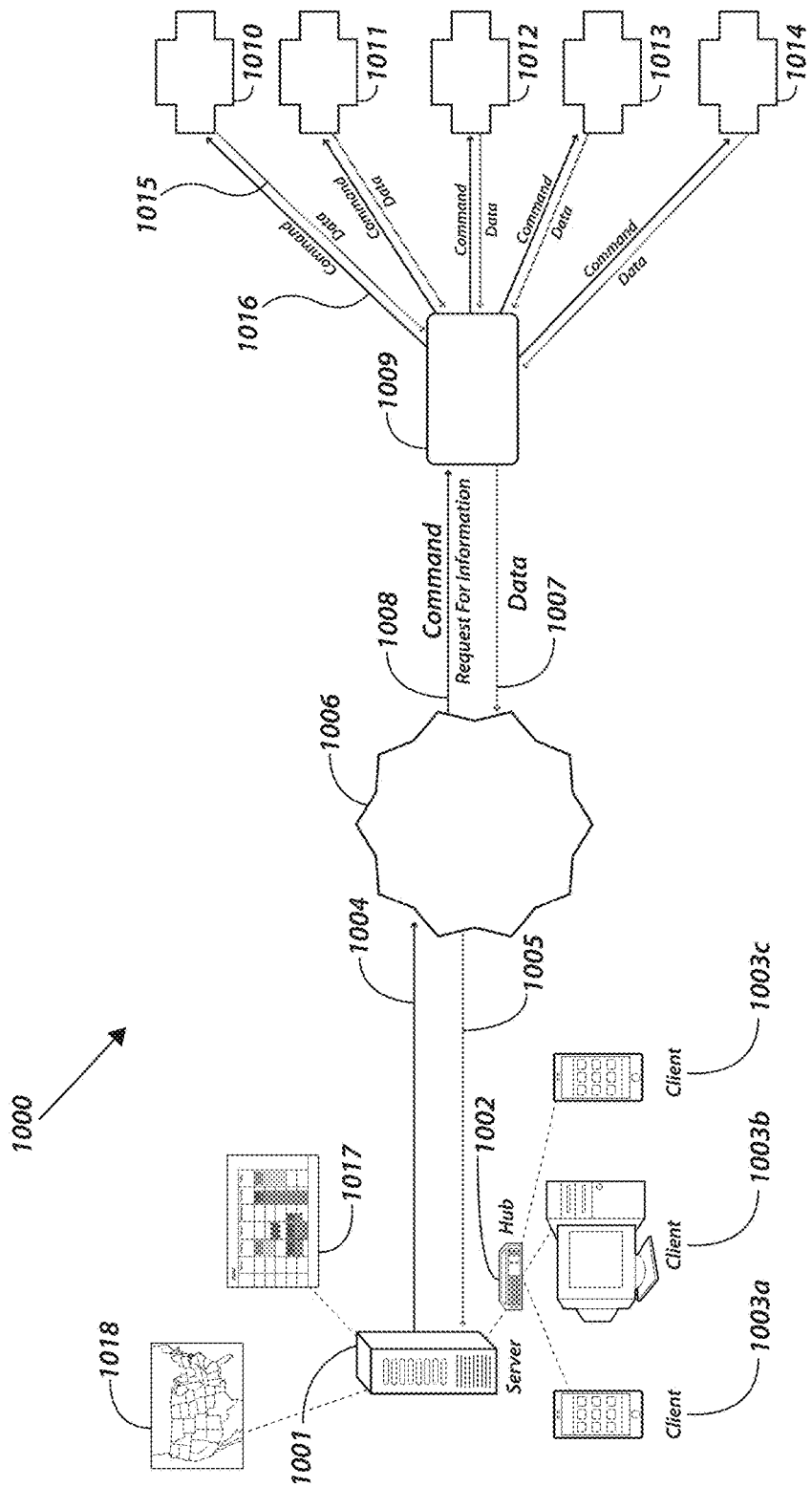
FIG. 10 is an illustration of a system for reserving venues for a plurality of subscribers within a network.

FIG. 10 is an illustration of a system 1000 of networked monitoring devices 1010-1014 for reserving venues for a plurality of subscribers within a network 1006. The networked monitoring devices 1010-1014 may include hardware devices such as, but not limited to, a motion detector, sound detector, light detector, pressure detector, or the like. For example, an exemplary networked monitoring device is an electronic line judge used to determine the location of a tennis ball struck on the court during a tennis match.

The networked monitoring devices 1010-1014 may respond to commands and in response thereto transmit data as illustrated by exemplary communication paths 1015, 1016. In some implementations, the networked monitoring devices 1010-1014 can be communicatively coupled to a device hub 1009 that receives commands via bi-directional data line 1005 (which may be routed to any or all of the networked monitored devices 1010-1014) which can in turn transmit data (via bi-directional data line 1005). The transmitted data may be routed to any or all of the networked monitored devices 1010-1014.

The transmitted data may be retrieved by one or more computing devices (e.g., via bi-directional data line 1004) such as a server 1001 which may be relayed to one or more clients 1003a-1003c (which may be communicatively coupled to a hub 1002). It should be understood by one having ordinary in the art that server 1001 is not limited to a hardware implementation. For example, server 1001 can be implemented within a cloud computing platform. Moreover, hub 1002 may not be limited to a hardware implementation and can therefore be implemented through software.

Clients 1003a-1003c may be any computing device which can access the Internet. As such, clients 1003a-1003c may be a smartphone device, desktop, laptop, 2:1, tablet, or the like. Notably, clients 1003a-1003c may be operated by users (e.g., subscribers) to access a scheduler 1017 (e.g., on server 1001) to reserve a venue for a particular time slot. In some embodiments, clients 1003a-1003c may be equipped with a software application that enables a user to reserve time slots for venues and receive notifications that a time slot is available for reservation.

Venues may be reserved to play any of various activities including physical and non-physical activities. For instance, a tennis court, basketball court, gym, soccer field, or the like may be reserved for play. In addition, other venues may be reserved for physical activities in which two or more individuals are needed to participate.

The present invention may employ a system such that a user can request a plurality of subscribers who fit a profile to participate in an activity at a first venue during a first time period. Subscribers may include any user which has downloaded or has access to a software application which facilitates implementations of the present invention. However, the present invention is not limited thereto. In some embodiments, a subscriber is any user which has access to a computing device that can be used to determine the user's distance from other subscribers and venues. The profile may be selected by a user subscriber seeking to reserve a venue or may be automatically retrieved based on default settings. In some implementations, the profile comprises at least one criteria that is partially set by a user and in part configured based on default settings. In some embodiments, the criteria may comprise settings based upon a user profile associated with the requesting user.

The default settings may comprise settings for a maximum distance a subscriber can be located from the first venue to receive a notification. In other embodiments, the default settings comprise a maximum distance a subscriber can be located from the initiator of the request to receive a notification. According to some embodiments of the present invention, the initiator may be an individual subscriber, team captain or club manager which have access to the system's software application. Alternatively, the initiator may be a software program that initiates requests based upon pre-configured settings.

In some embodiments, a user can dictate a specific location, area, or region where the request can be sent. In other words, the initiator's present location does not limit the area where the request is sent as the initiator or may be at another location at a later time, etc. These capabilities and more may be accomplished by a software application present on a computing device (e.g., a smartphone). Furthermore, a user may also sync said software application with the user's calendar such that a "social play" request is dispatched during available times in the user's schedule and according to acceptable times configured in a subscriber user's settings.

For example, based on the location of the venue, only subscribers within a pre-determined distance can receive the reservation request notifications. In other implementations, only subscribers within a pre-determined distance from the initiating subscriber can receive reservation request notifications.

In some implementations, the user which initiated the request may first receive an automatic notification to play the physical sport at a venue during an unreserved time slot. In some embodiments, the request(s) are automatically sent to available subscriber recipients which meet a particular profile after the sender completes a reservation for the venue.

When a subscriber recipient of the dispatched request indicates that they would like to participate in the activity (e.g., via a function on a software application), the initiator (e.g., mobile subscriber) can determine whether the subscriber recipient is a suitable player option. In the event that a particular subscriber recipient is selected to participate, an acknowledgment notification may be sent to the subscriber recipient in return. Moreover, in the event that more subscriber recipients indicate their interest to participate in the activity than requested, the subscriber recipients may be chosen to participate in the order in which said subscriber recipients indicate their interest.

In yet another implementation, the initiator of the request receives a list of the subscribers who indicated their interest to participate in an activity and the initiator can in turn choose from the list those subscribers whom the initiator desires to participate with in the activity.

In some implementations, each subscriber may have a "favorites" list of subscribers they wish to play with. Thus, a subscriber's favorites list may be used to select amongst available subscribers. Furthermore, administrative settings may be configured such that subscribers can only choose to play with other subscribers that are within a set "X" degree(s) of separation. "Degrees of separation" includes the idea that any person can be connected to any other person through a chain of known persons that has "X−1" intermediaries according to some embodiments of the present invention.

In one or more implementations, the software application can allow users to identify persons within their network (e.g., family, friends, classmates, associates, etc.) such that requests for play will only be sent to subscribers that are within a pre-configured number of degrees of separation. For example, a user can configure their settings within the software application such that requests are only sent to subscribers that are within two degrees of separation (e.g., user's friends' friends) or alternatively expand the amount of available players by increasing the degrees of separation (e.g., 4). It should be understood by one having ordinary skill in the art that the system may also be configured such that subscribers can also configure their settings such that they only receive activity participation requests according to a pre-configured number of degrees of separation (e.g., 2). As such, the present invention includes the capability for users and subscriber recipients to indicate their ability to participate in activities with persons according to their personal comfort levels.

For example, subscriber settings may be set such that they can engage with those that are within three degrees of separation from their known contacts (e.g., family, friends, associates). However, one having ordinary skill in the art would appreciate that the present disclosure is not limited to any number of degrees of separation from a user's known contacts list. Moreover, subscribers may also have an "excludes" list. The "excludes" list may include a list of individuals that a subscriber has elected not to participate with in any activity.

In addition, the present invention may be employed such that a subscriber can request groups rather than single individual subscribers. As such, subscribers can be set up as groups such that a selected member of the group can respond on behalf of the entire group to indicate the group's participation. Yet, in other embodiments, the application may be configured such that each member of the group needs to respond.

Notably, the present invention may employ a system such that in response to receiving a notification from the networked monitoring devices stationed within a venue that motion is not detected for a first time duration during a first time period, a request is sent to a plurality of subscribers who fit a profile to participate in an activity at the first venue during the first time period.

For example, one or more networked monitoring devices may be stationed at a tennis court to detect whether tennis players are presently playing on the tennis court. If the networked monitoring device(s) does not detect activity within the first twenty minutes of a reserved time slot, they may send notification(s) to a scheduler that tennis play was undetected and that the venue is therefore available for others to reserve. In some implementations, a scheduler 1017 is hosted on one or more computer servers 1001 on the network 1006 and is therefore accessible to a plurality of subscribers.

Any of the networked monitoring devices may be classified as a primary, secondary, or backup networked monitoring device. A priority scheme may be employed to gauge reliability of whether or not a venue is presently being utilized. As such, the present invention may employ a priority scheme when determining whether a venue is currently occupied.

A system consistent with the present invention may be configured such that an administrator may have the capability to "block off" times on a scheduler (e.g., during non-business hours) such that reservations can only be made during certain time periods (e.g., during regular business hours). In addition, at any given time, an administrator may manually select or deselect any networked monitoring device to send notifications based on that device's detections. For example, if a motion detector is the only networked monitoring device that is operable, an administrator may choose to have notifications transmitted about activity at a venue from that specific networked monitoring device. An administrator may also have the capability to manually check whether activity is detected at any venue by sending direct commands to the network monitoring device(s) at any desired time.

In some embodiments, the user which initiated the request and whose cohort failed to utilize the event may be charged a cancellation fee. The cancellation fee may be debited using payment card (e.g., credit card) information electronically stored in the user's profile. In some implementations, only the initiating subscriber is charged a cancellation fee. In other implementations, all subscribers in the cohort that are selected to participate in the activity are each charged a cancellation fee.

A subscriber may be charged once the subscriber initiates a "social play" function. In other implementations, a subscriber is charged only when enough subscribers indicate that they are available to participate in the activity. However, it should be understood by one having ordinary skill in the art that a subscriber may be billed according to various billing schemes.

Moreover, the system may automatically send a request to a plurality of subscribers who fit the profile to participate in the activity in response to receiving another notification from the networked monitoring devices that motion is not detected for a second time duration that is later in time than the first time duration. For example, if a subscriber who reserved a venue actually shows up with his cohort to play on the tennis court but they leave early, a networked monitoring device may send a notification of such so that the venue may be accessible to others for the remaining time of the reservation.

For instance, if the players leave the venue before the expiration of the reservation for a threshold time period (e.g., 20 minutes), a notification of such may be sent to a scheduler 1017. In addition, a notification may be sent subject to the amount of time that is left in the reservation. For example, if there is at least one hour left on the reservation and no activity has been detected within the last 20 minutes, a networked monitoring device may send a notification that the venue is open for a new reservation for the balance of time left on the reservation (or greater if more time permits). It should be understood by those having ordinary skill in the art that the system may employ the same or different time thresholds for which the network monitoring devices can dispatch notifications.

The present invention also provides a means of automatically dispatching reservation requests to a plurality of subscribers. The system may include providing a scheduler for reservations. When a time slot is unreserved on the scheduler, an application may be configured to send a request to a plurality of subscribers who fit a profile to engage in an activity at a venue during a specific time slot. Accordingly, the scheduler 1017 may be updated when a subscriber that received the requests reserves the unreserved time slot. In some embodiments, the reservation request is sent automatically when the time slot is unreserved for a default time period.

In some embodiments, the scheduler 1017 may have access to weather data 1018. Weather data 1018 may be used to update reservations. For example, if weather data 1018 indicates that a venue (e.g., open tennis court) will be subject to poor weather conditions, a notification may prompt the subscriber which reserved the venue to change venues. Furthermore, the system may recommend other venues that are unreserved and are not subject to poor weather conditions. If no other venues are available at the reserved time, the system may recommend that the subscriber reserves the venue on another date and time.

Advantageously, a smartphone device may be equipped with a software application such that a mobile user can employ "social play" at any desired time. Employing social play may include sending a notification to a plurality of users, based on a desired profile set by the mobile user (or by a default setting), to participate in an activity at a venue at a desired time. The user may select the venue before the request is dispatched or the software application may designate a venue based upon default settings (e.g., availability, location to user, weather conditions, type of activity, etcetera).

The subscriber recipients that received the request may elect to participate in the activity by indicating such with the software application on their smartphone device. If a subscriber recipient elects to participate in the activity, the system may determine among other subscriber recipients, whom have elected to participate, which of these will be selected. The system may be configured to notify the subscriber recipients to whether they were selected to participate or not. In some implementations, some subscriber recipients may be placed on a waiting list and may be selected in the event that any selected subscriber may choose not to participate in the activity.

In addition, venues (e.g., club houses) may use an electronic scheduler to reserve their venue with club members. For unreserved time slots, administrators may manually dispatch a request to club members that the venue is open for reservations. In addition, administrators may open the venue up to the public via a software application for reservations. The electronic scheduler may also be configured to automatically send requests to club owners or the public whenever the venue(s) are unreserved or become available.

Systems and methods describing the present invention have been described. It will be understood that the descriptions of some embodiments of the present invention do not limit the various alternative, modified, and equivalent embodiments which may be included within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

What is claimed is:

1. A non-transitory machine-readable storage medium containing instructions that, when executed
    causes a scheduler to send requests to a plurality of subscribers who fit a first profile to play a physical sport at a first venue during a first time period;
    wherein the requests sent to the plurality of subscribers are initiated by a mobile subscriber user and wherein each of the plurality of subscribers are within three degrees of separation of known contacts of the mobile subscriber that initiated the request;
    wherein the first profile comprises at least one criteria and is partially set by a sender of the request and in part configured by default settings.

2. The non-transitory machine-readable storage medium of claim 1, wherein the default settings comprise a maximum distance a subscriber recipient can be located from the first venue to receive a notification.

3. The non-transitory machine-readable storage medium of claim 1, wherein the default settings comprise a maximum distance a subscriber recipient can be located from the initiator of the request to receive a notification.

4. The non-transitory machine-readable storage medium of claim 1, wherein the at least one criteria further comprises settings associated with a user profile associated with the sender of the request.

5. The non-transitory machine-readable storage medium of claim 1, wherein the physical sport is at least one of tennis, basketball, soccer, or volleyball.

6. The non-transitory machine-readable storage medium of claim 1 further containing instructions, that when executed, causes the scheduler to receive a notification from each subscriber recipient that is available to play the physical sport at the first venue during the first time period.

7. The non-transitory machine-readable storage medium of claim 1 further containing instructions, that when executed, causes the machine to send an acknowledgment notification to each subscriber recipient that has been selected to play the physical sport at the first venue during the first time period.

8. The non-transitory machine-readable storage medium of claim 1 further containing instructions, that when executed, causes the machine to automatically send the request to the plurality of subscribers after the sender sets a reservation for the venue.

9. A non-transitory machine-readable storage medium containing instructions, that when executed
    causes a scheduler to: in response to receiving a first notification from at least one networked hardware device stationed within a first venue that activity has not been detected for a first time duration during a first time period, causes a machine to send requests to a plurality of subscribers who fit a first profile to play a physical sport at the first venue during the first time period;
    wherein the requests sent to the plurality of subscribers are initiated by a mobile subscriber user and wherein each of the plurality of subscribers are within three degrees of separation of known contacts of the mobile subscriber that initiated the request;
    wherein the first profile comprises at least one criteria and is partially set by a sender of the request and in part configured by default settings.

10. The non-transitory machine-readable storage medium of claim 9 further containing instructions, that when executed, causes a machine to send a second notification to the scheduler when a subscriber recipient is granted a reservation of the first venue during the first time period.

11. The non-transitory machine-readable storage medium of claim 10 further containing instructions, that when executed, cause a machine to send a request to the plurality of subscribers who fit the first profile to play the physical sport at the first venue in response to receiving a third notification from the at least one networked hardware device that activity is not detected, at a second time duration that is later in time than the first time duration.

12. The non-transitory machine-readable storage medium of claim 11 further containing instructions, when executed, cause a machine to charge a payment account associated with a subscriber which failed to reach the venue during the reserved time.

13. The non-transitory machine-readable storage medium of claim 9, wherein the first time duration and the second time duration are different.

14. The non-transitory machine-readable storage medium of claim 9, wherein the first notification is received from a motion detector.

15. The non-transitory machine-readable storage medium of claim 9, wherein the first notification is received from a sound detector.

16. A non-transitory machine-readable storage medium containing instructions that, when executed
    causes a scheduler to be available for electronic reservations; and
    when a time slot is unreserved on the scheduler, causes a machine to send requests to a plurality of subscribers who fit a first profile to play a physical sport at a first venue during a first time period;
    wherein the requests sent to the plurality of subscribers are initiated by a mobile subscriber user and wherein each of the plurality of subscribers are within three degrees of separation of known contacts of the mobile subscriber that initiated the request;
    wherein the first profile comprises at least one criteria and is partially set by a sender of the requests and in part configured by default settings;
    wherein the default settings comprise a maximum distance a subscriber recipient can be located from the first venue to receive a first notification.

17. The non-transitory machine-readable storage medium of claim 16 further containing instructions that, when executed, cause a scheduler to be updated when a subscriber reserves the unreserved time slot.

18. The non-transitory machine-readable storage medium of claim 16, wherein the requests are sent automatically when the time slot is unreserved for a default time period.

19. The non-transitory machine-readable storage medium of claim 16 further containing instructions that, when executed, causes the scheduler to change a reservation upon receiving data related to a weather event near the first venue.

20. The non-transitory machine-readable storage medium of claim 19, wherein the change to the reservation is from the first venue to a second venue.

21. The non-transitory machine-readable storage medium of claim 16 further containing instructions that, when executed, cause a machine to send a request to a plurality of subscribers who fit a first profile to play a physical sport at the first venue during the first time period in response to receiving a second notification from at least one hardware device stationed within a first venue that motion is not detected for a first time duration during the first time period, wherein the first profile comprises at least one criteria and is partially set by a sender and in part configured by default settings associated with a sending device.

22. The non-transitory machine-readable storage medium of claim 16 further containing instructions that, when executed, causes the scheduler to retrieve weather data.

\* \* \* \* \*